United States Patent [19]

Fevrier et al.

[11] Patent Number: 4,910,868
[45] Date of Patent: Mar. 27, 1990

[54] MANUFACTURING PROCESS OF AN ELECTRICAL CONTACT WITH CONTACT PAD

[75] Inventors: Georges Fevrier, Vizille; Jacques Vanin, Grenoble; Jean-Paul Favre-Tissot, Brignoud, all of France

[73] Assignee: Merlin Gerin, France

[21] Appl. No.: 311,040

[22] Filed: Feb. 16, 1989

[30] Foreign Application Priority Data

Feb. 25, 1988 [FR] France ................................ 8802443
Jul. 6, 1988 [FR] France ................................ 8809277

[51] Int. Cl.⁴ ............................................. H01R 43/02
[52] U.S. Cl. ........................................ 29/679; 29/875; 264/61; 419/45
[58] Field of Search ..................... 29/875, 878, 879; 264/61; 419/45

[56] References Cited

U.S. PATENT DOCUMENTS

| 1,922,162 | 8/1933 | King .................................. 29/875 X |
| 2,179,960 | 11/1939 | Schwarzkoff ..................... 29/875 X |
| 2,382,338 | 8/1945 | Schubert ........................... 29/875 X |
| 2,425,053 | 8/1947 | Swinehart ......................... 29/875 X |
| 2,545,352 | 3/1951 | Gibbs . |
| 3,199,176 | 8/1965 | Freudiger et al. ..................... 29/875 |
| 3,346,951 | 10/1967 | Gwyn . |
| 4,478,590 | 10/1984 | Rychlewski ...................... 264/61 X |

FOREIGN PATENT DOCUMENTS

| 0059341 | 9/1982 | European Pat. Off. . |
| 444445 | 3/1936 | United Kingdom .................. 29/875 |
| 593171 | 10/1947 | United Kingdom . |
| 749390 | 5/1956 | United Kingdom .................. 29/878 |
| 2022142 | 12/1979 | United Kingdom .................. 29/875 |

Primary Examiner—Carl J. Arbes
Attorney, Agent, or Firm—Arnold, White & Durkee

[57] ABSTRACT

A contact part is shaped to form a cavity in which a sintered or agglomerated block is placed before the assembly is placed on a welding press causing fixing and shaping of the block to form the contact pad. The protuberance of the pad may result from a deformation of the support in the course of the fixing operation, by a pin supported by the electrode of the welding machine coming up against the face opposite to the pad of the support.

8 Claims, 2 Drawing Sheets

MANUFACTURING PROCESS OF AN ELECTRICAL CONTACT WITH CONTACT PAD

BACKGROUND OF THE INVENTION

The invention relates to a manufacturing process of a composite part constituted by a pad made of a material obtained by agglomeration of mainly metal powder, rendered mechanically and electrically secure to a support.

The choice of the materials and surface of an electrical contact, notably a switchgear device contact, depends on a number of factors, in particular the mechanical resistance and the arcing resistance. A contact part of the kind mentioned, constituted by a support and a contact pad, enables these requirements to be taken into account. The pad, made for example of silver or copper alloy, is generally manufactured separately, for example by sintering, and fixed or fitted onto the copper support, after being decarburized, when it comprises graphite.

The object of the present invention is to simplify this manufacturing process while at the sam time improving the quality of the contact parts manufactured.

SUMMARY OF THE INVENTION

The manufacturing process according to the invention is characterized in that the support is pre-shaped to form a cavity, at the desired location for the pad, which cavity forms with another cavity arranged in the electrode of a resistance welding machine, a practically tight enclosure in which a block of precompressed, agglomerated or sintered powder is deposited, and that this powder is highly compressed by reduction of the cavity while an electrical current of suitable intensity is applied in order to heat the material to the required temperature to accomplish the shaping and/or sintering.

The fixing operation simultaneously causes shaping or confirmation of the shape of the pad by the same tool thus achieving a notable time-saving and improvement of the fixing.

According to an embodiment of the invention, the shape of the cavity created in the support is conjugate with that of a sintered block which is placed therein. The support with the sintered block is placed on a welding machine performing fixing of the block on the support. The configuration of the welding machine electrode applied to the block determines the shape of the contact pad protruding above the support in the course of the fixing operation. The protrusion of the sintered pad can result from deformation of the support, notably from pushing back the boss conjugate to the cavity. This deformation of the support is accomplished in the course of the fixing operation, by using a suitable electrode able to simply push back the boss, or even to create a push-in on the opposite side from the pad. The operation is carried out under pressure, applied by the welding machine electrodes, this pressure being advantageously comprised between 5 and 20 Kg/sq. mm (1 Kg/sq. mm=98.1 bars), for silver-based pads. After the pressure has been applied, an electrical current is applied by means of the electrodes and the support, sintered block assembly to bring about heating causing the fixing operation to be accomplished. The temperature can be comprised between 700 and 900° C. maintained for one or more seconds, sufficient for the operation.

The pad material can be a pure metal but is generally a silverbased pseudo-alloy, notably graphite silver, metal oxide silver, tungsten silver or nickel silver. For certain special applications, this material may be copper-based, notably tungsten copper or tellurium copper. The support is generally made of copper or copper alloy, but the invention can be applied to other materials. The process can easily be automated and certain operations can be carried out simultaneously, notably stamping of the support and shaping of the cavity.

According to another embodiment, the cavity is filled with powder, which may be precompressed and/or agglomerated, and sintering and fixing on the support are carried out simultaneously on the welding machine.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
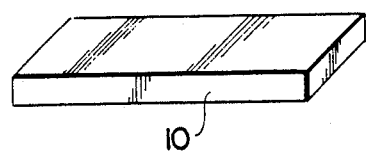
FIG. 1 is a schematic perspective view of the contact support according to the invention.
Figure 2:
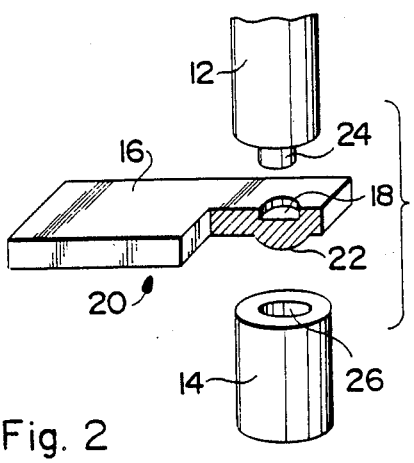
FIG. 2 illustrates the punching phase of the support according to FIG. 1 to form the cavity receiving the sintered block.

In the figures, a contact part 10, for example a contact of a low voltage current switchgear device, is cut out from a strip of copper or any other electrically-conducting material, with a pre-determined outline, for example parallelipipedic-rectangle. In the example illustrated by the figures, the thickness of the copper plate is close to 2 mm, and the width close to 12 mm, but it is clear that the invention can be applied to contacts with different dimensions adapted to suit the characteristics of the switchgear devices comprising this contact. The contact part 10 is inserted between a punch 12 and a die 14 of a press, capable of deforming the part 10 to create a cavity 18 and, on the opposite side 20, a boss 22, at the location where the contact pad is to be fitted, notably on the large upper side face 16 of the part. In the example presented here, the punch 12 has a pin 24 of conjugate shape to that of the cavity 18, this pin 24 bumping out the material to bring the boss 22 out on the opposite face. The pin is for example cylindrical in shape, whereas the die 14 is hollowed out in the center 26 to allow the boss 22 to form. It is clear that this pre-shaping operation can be performed on the same machine as the cutting or stamping of the contact part 10.

Figure 3:
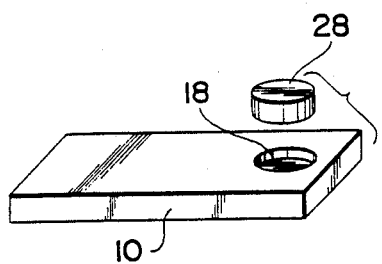
FIGS. 3 and 4 illustrate the insertion phases of a sintered block into the cavity.
Figure 4:
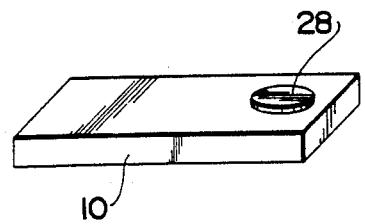

The next operation consists in inserting a sintered block 28 in the cavity 18 as shown in FIGS. 3 an 4. The block 28 is achieved in the usual manner by sintering of a powder for example graphite silver, nickel silver, tungsten silver or metal oxide silver, on a separate machine. The block 28 may have the final shape of the contact pad or approximately this shape or on the other hand undergo deformation during the fixing operation.

Figure 5:
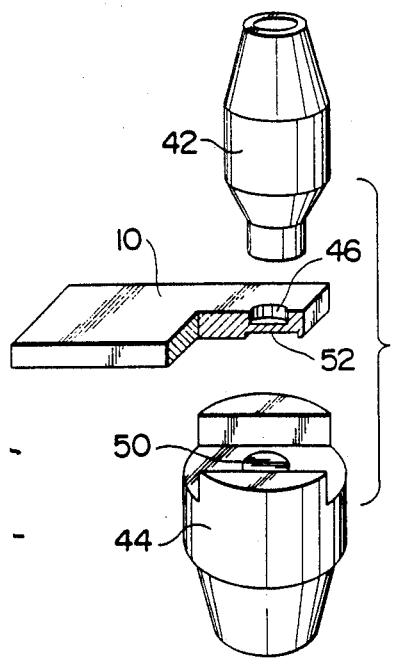
FIG. 5 shows in perspective the support fixing and deforming machine.
Figure 7:
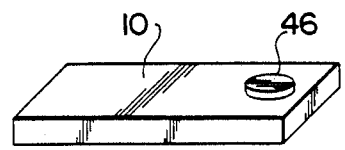
FIG. 7 is a perspective view of the contact part in the finished state.
Figure 6:
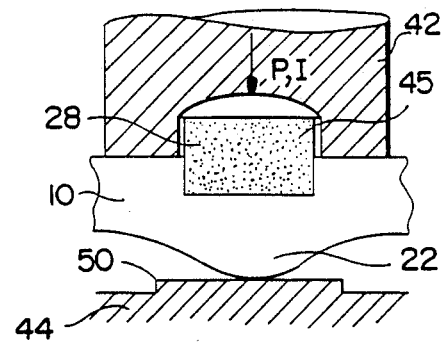
FIG. 6 is an enlarged scale view showing the support and the block in the course of fixing.
Figure 8:
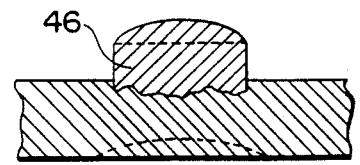
FIG. 8 is a longitudinal cross-section of the part according to FIG. 7.

The block 28 may or may not be decarburized. In the example illustrated, the cavity 18 is completely filled with by the sintered block and tee latter forms a protrusion or protruberance. The block may also be flush with the upper face 16 of the part 10 or even be slightly below it when the cavity 18 is not completely filled. This part 10 with the cavity 18 filled by the block 28 is then placed n a welding machine only the two top 42 and bottom 44 electrodes of which are represented. The welding machine is of a relatively common type capable of applying a pressure on the treated parts while applying an electrical current to heat the parts. The top electrode 42 has a print 45 of conjugate shape to that desired for the pad 46 obtained by shaping of the block 28, whereas the bottom electrode 44 presents for example a slightly protruding pin 50, capable of pushing the boss 22 back. It can be seen in FIG. 5, which represents the part 10 after fixing, that the pin 50 causes not only pushing-back of the boss 22, but also a slight hollow 52 favoring compression of the block 28 and protrusion to form the pad 46 of the part 10. In one of the applications of the invention, taken only as a concrete illustration, the electrodes 42, 44 are made of tungsten and the pressure is comprised between 5 and 20 Kg/sq. mm depending on the characteristics of the contact part 10. The current intensity must cause heating in the 700 to 900° C. range, this intensity being for instance around 18 kilo-amps in the case of a contact part having a thickness of about 2 mm, as described above. The time during which the current is applied, which corresponds to the operation, is in the order of one second, and in all cases extremely fast. When the volume of the sintered block inserted in the cavity 18 is sufficient to create a protruberance, it i not indispensable to push the boss 22 back, and the bottom electrode 44 is in this case not fitted with a pin 50. This pushing-back operation is nevertheless indispensable when the cavity is only partially or completely filled by the sintered block. The quality of the mechanical and electrical fixing of the pad 46 on the part or support 10 is excellent. To give an example, it can be specified that the pad 46 protrudes out by a height of about one millimeter while penetrating into the support 10 y almost the same height. The width of the support 10 is several millimeters, for example 7 millimeters, other values naturally being admitted. The referred process according to the invention makes us of the pushing-back of the boss 22 to ensure compression and a sufficient protrusion of the pad 46, but the invention is not limited to this particular process.

The presses and welding machines are standard machinery wellknown to those specialized in the art, and the various operations do not require any special precautions. The contact part 10 may be a stationary contact or a movable contact of a low voltage switchgear device, notably a circuit breaker, but the process is applicable to any other type of electrical contact, notably of a contactor or switch.

According to an alternative embodiment, the block 28, inserted in the cavity 18, is a block of powder, which may be agglomerated or precompressed. The block 28 can also be constituted on the spot by inserting and precompressing powder in the cavity 18. The part 10 with the block 28 is then placed on the welding machine in the manner described above. The powder sintering operation and the fixing operation are concomitant. All the special features mentioned above are naturally applicable to this process.

According to another alternative embodiment, the block of powder is compressed by a piston incorporated in the upper electrode 42 to perform the sintering and-/or fixing operation when heating takes place.

We claim:

1. A method of manufacturing a composite contact part constituted by a pad and a support to which the pad is mechanically and electrically secured comprising the steps of:

pressing an intimate mixture of mainly metal powders to form a block of precompressed, agglomerated or sintered powder, which permits the manufacture of the desired pad;

pre-shaping the support to form a cavity at a desired location for the pad;

depositing said block in the cavity;

placing the support on a first electrode of a resistance welding machine so that the cavity faces a second electrode of the resistance welding machine, the second electrode having a cavity which forms, together with the cavity of the support, a practically tight enclosure when the second electrode is applied on the support;

applying the second electrode to the support;

heating the block by passing an electric current between said first and second electrodes in such a manner that the current passes through said block; and compressing the enclosure formed by said cavities by applying a pressure to the support from the first and/or second electrodes to accomplish the shaping and/or sintering of the block and fixing on the support.

2. A method according to claim 1 wherein the volume of said enclosure is reduced by the deformation of the support under the compression force exerted by the first and second electrodes.

3. A method according to claim 1 wherein the support is pre-shaped to form, on the face of the support opposite the face of the cavity, a boss which is pushed back in the course of the heating and compressing steps.

4. A method according to claim 3, wherein the face of the electrode applied to the support has a protruding pin to push the boss into the support forming a slight hollow.

5. A method according to claim 1, wherein the pad is a silver-based alloy.

6. A method according to claim 1, wherein the pad is a copper-based alloy.

7. A method according to claim 5, wherein said pad is a graphite silver alloy having no been decarburized before being fixed to aid support.

8. The process according to claim 1, wherein the pressure applied is comprised between 5 and 20 Kg/sq.mm and the temperature between 700 and 900° C.

* * * * *